United States Patent
Nakashima et al.

(10) Patent No.: US 12,509,604 B2
(45) Date of Patent: Dec. 30, 2025

(54) PHOTOCURABLE AQUEOUS INK COMPOSITION FOR INKJET PRINTING

(71) Applicant: SAKATA INX CORPORATION, Osaka (JP)

(72) Inventors: Okinori Nakashima, Osaka (JP); Jun Kinjoh, Osaka (JP); Daigo Shiozaki, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 645 days.

(21) Appl. No.: 17/995,679

(22) PCT Filed: Apr. 15, 2021

(86) PCT No.: PCT/JP2021/015569
§ 371 (c)(1),
(2) Date: Oct. 6, 2022

(87) PCT Pub. No.: WO2021/215341
PCT Pub. Date: Oct. 28, 2021

(65) Prior Publication Data
US 2023/0151238 A1    May 18, 2023

(30) Foreign Application Priority Data
Apr. 24, 2020   (JP) ................ 2020-077802

(51) Int. Cl.
| | | |
|---|---|---|
| C09D 11/38 | (2014.01) | |
| C09D 11/033 | (2014.01) | |
| C09D 11/101 | (2014.01) | |
| C09D 11/107 | (2014.01) | |
| B41J 2/01 | (2006.01) | |

(52) U.S. Cl.
CPC ............ *C09D 11/38* (2013.01); *C09D 11/033* (2013.01); *C09D 11/101* (2013.01); *C09D 11/107* (2013.01); *B41J 2/01* (2013.01)

(58) Field of Classification Search
None
See application file for complete search history.

(56) References Cited

U.S. PATENT DOCUMENTS

| 2017/0107386 A1 | 4/2017 | Herlihy et al. |
| 2018/0291219 A1 | 10/2018 | Kiyosada |
| 2025/0109309 A1* | 4/2025 | Kinjoh .................. C09D 11/36 |

FOREIGN PATENT DOCUMENTS

| EP | 0337705 A2 * | 10/1989 | ........... C09D 11/101 |
| EP | 2505622 A1 * | 10/2012 | ........... C09D 11/101 |
| EP | 3110893 A1 | 1/2017 | |
| EP | 3251818 A1 * | 12/2017 | ............... C08F 2/50 |
| EP | 4299321 A1 | 1/2024 | |
| JP | 2004323753 A | 11/2004 | |
| JP | 2007314611 A | 12/2007 | |
| JP | 2011195822 A | 10/2011 | |
| JP | 2012025834 A | 2/2012 | |
| JP | 2012052066 A | 3/2012 | |
| JP | 2012062451 A | 3/2012 | |
| JP | 2012102259 A | 5/2012 | |
| JP | 2013040267 A | 2/2013 | |
| JP | 2013043945 A | 3/2013 | |
| JP | 2017524750 A | 8/2017 | |
| JP | 2019005992 A | 1/2019 | |
| JP | 2021084943 A | 6/2021 | |
| WO | WO-2015131027 A1 * | 9/2015 | ........... C09D 11/103 |
| WO | 2015183719 A1 | 12/2015 | |

OTHER PUBLICATIONS

International Search Report (ISR) mailed Jul. 13, 2021, issued for International application No. PCT/JP2021/015569. (3 pages).
International Preliminary Report on Patentability, dated Oct. 25, 2022, for corresponding international application PCT/JP2021/015569 (1 page).
Notification Concerning Transmittal of International Preliminary Report on Patentability, mailed Nov. 3, 2022, for corresponding international application PCT/JP2021/015569 (1 page).
Notification of Transmittal of Translation of the International Preliminary Report on Patentability, mailed Nov. 3, 2022, for corresponding international application PCT/JP2021/015569 (1 page).
Written Opinion of the International Searching Authority, mailed Jul. 13, 2021, for corresponding international application PCT/JP2021/015569 (6 pages).
"Handbook of the Technology and Economy of World Fine Chemical Products," Institute of Scientific and Technical Information, Chemical Industry Department, p. 1037, Fenning County Printing Plant, Hebei Province, Dec. 1988 (3 pages).
A First Office Action issued by the State Intellectual Property Office of China on Feb. 13, 2023, for Chinese counterpart application No. 202180027507.4 (7 pages).
Extended European Search Report (EESR) dated Apr. 23, 2024, issued for European counterpart patent application No. EP21793716.8 (7 pages).

\* cited by examiner

*Primary Examiner* — Sanza L. McClendon
(74) *Attorney, Agent, or Firm* — Law Office of Katsuhiro Arai

(57) ABSTRACT

An object of the present invention is to provide a photocurable aqueous ink composition for inkjet printing that is excellent in all aspects including miscibility when components excluding pigments and pigment dispersants are mixed, curability during printing, adhesion property and water resistance of a printed coating film. As a solution, provided is a photocurable aqueous ink composition for inkjet printing including: water by 10.0 to 45.0% by mass in the photocurable aqueous ink composition for inkjet printing; a colorant; a water-soluble polymerizable compound containing N-monosubstituted acrylamide; and a photoinitiator.

5 Claims, No Drawings

PHOTOCURABLE AQUEOUS INK COMPOSITION FOR INKJET PRINTING

CROSS-REFERENCE TO RELATED APPLICATIONS

This application is the U.S. National Phase under 35 U.S.C. § 371 of International Application PCT/JP2021/015569, filed Apr. 15, 2021, which claims priority to Japanese Patent Application No. JP2020-077802, filed Apr. 24, 2020. The International Application was published under PCT Article 21(2) in a language other than English.

TECHNICAL FIELD

The present invention relates to a photocurable aqueous ink composition for inkjet printing that is excellent in miscibility when components excluding pigments and pigment dispersants are mixed during production of an ink, curability during printing, and adhesion property and water resistance of a printed coating film. The present invention also pertains to a printed matter obtained using the photocurable aqueous ink composition for inkjet printing.

BACKGROUND ART

Photopolymerizable aqueous inkjet ink compositions use water as a solvent and thus, they are superior from an environmental perspective compared to ink compositions that use an organic solvent.

Further, as illustrated in Patent Literature 1, UV-curable aqueous inkjet inks are known that contain, for example, N-isopropyl acrylamide to improve stability over time and abrasion resistance of the ink composition with a water content ratio of 50% by weight or more. However, it does not mention obtaining a photocurable aqueous ink composition for inkjet printing that is excellent in all aspects including miscibility when components excluding pigments and pigment dispersants are mixed, curability during printing, and adhesion property and water resistance of a printed coating film. The above photocurable aqueous ink composition for inkjet printing cannot meet these high demands.

BACKGROUND ART LITERATURE

Patent Literature

Patent Literature 1: Japanese Patent Laid-open No. 2013-43945

SUMMARY OF THE INVENTION

Problems to be Solved by the Invention

An object of the present invention is to provide a photocurable aqueous ink composition for inkjet printing that is excellent in all aspects including miscibility when components excluding pigments and pigment dispersants are mixed, curability during printing, and adhesion property and water resistance of a printed coating film.

Means for Solving the Problems

After studying in earnest to achieve the aforementioned object, the inventors of the present invention found that the aforementioned object could be achieved by a specific composition, and eventually completed the present invention.

To be specific, the present invention encompasses the following:

1. A photocurable aqueous ink composition for inkjet printing, comprising: water by 10.0 to 45.0% by mass in the photocurable aqueous ink composition for inkjet printing; a colorant; a water-soluble polymerizable compound containing N-monosubstituted acrylamide; and a photoinitiator.
2. The photocurable aqueous ink composition for inkjet printing according to 1, which comprises N-monosubstituted acrylamide by 10.0 to 30.0% by mass relative to an entire photopolymerizable component.
3. The photocurable aqueous ink composition for inkjet printing according to 1 or 2, which comprises an epoxy acrylate oligomer.
4. The photocurable aqueous ink composition for inkjet printing according to any one of 1 to 3, which comprises acryloyl morpholine and/or diethylacrylamide.

Effects of the Invention

The photocurable aqueous ink composition for inkjet printing of the present invention is excellent in all aspects including miscibility when components excluding pigments and pigment dispersants are mixed, curability during printing, and adhesion property and water resistance of a printed coating film.

MODE FOR CARRYING OUT THE INVENTION (Colorant)

The colorant contained in the photocurable aqueous ink composition for inkjet printing of the present invention is preferably selected from known organic color pigments and inorganic color pigments conventionally used for photocurable aqueous ink compositions for inkjet printing.

Specific examples of organic color pigments include azo-based, azomethine-based, polyazo-based, phthalocyanine-based, quinacridone-based, anthraquinone-based, indigo-based, thioindigo-based, quinophthalone-based, benzimidazolone-based, isoindoline-based, isoindolinone-based, and other organic color pigments, where specific examples as expressed by the color index include Pigment Black 7, Pigment Blue 15, 15:1, 15:3, 15:4, 15:6, 60, Pigment Green 7, 36, Pigment Red 9, 48, 49, 52, 53, 57, 97, 122, 149, 168, 177, 178, 179, 206, 207, 209, 242, 254, 255, Pigment Violet 19, 23, 29, 30, 37, 40, 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, Pigment Orange 36, 43, 51, 55, 59, 61, 71, 74, etc.

The content of the organic color pigment in the ink composition of the present invention is preferably 1.0 to 10.0% by mass.

(Carbon Black)

Carbon black that has been conventionally used for inkjet may be used as a inorganic color pigment. Since the smaller the average primary particle size, the more likely abrasion resistance and gloss performance of the obtained colored image are improved, the average primary particle size is preferably 15 to 40 nm, or more preferably 20 to 30 nm.

The average primary particle size of carbon black means the value obtained as described below. That is, first, a dispersion liquid is prepared that is obtained by sufficiently diluting and dispersing carbon black in chloroform to such a concentration that, when an image of carbon black aggregates is taken by a transmission electron microscope (TEM), images of aggregates on the photo do not overlap each other. Next, the dispersion liquid is spread on a mesh with a collodion film and dried. In this state, a photo is taken to obtain a TEM photo (magnified by thirty thousand times). The TEM photo is read by a scanner, and image signals are digitized and then input to a computer. The area of each aggregate is calculated by image analysis. Furthermore, based on the area of each aggregate and the number of aggregated primary particles, the average area of the primary particles is obtained. The diameter of a circle having the same area as the average area is arithmetically set as the average particle size of the primary particles. Finally, the arithmetic mean of the average particle size of the primary particles based on all of the aggregates or a specific number of aggregates is obtained to be set as the average primary particle size.

In the case that carbon black is contained in the present invention, the content of carbon black is 1 to 12% by mass, or preferably 2 to 6% by mass relative to the entire photocurable aqueous ink composition for inkjet printing. A content less than 1% by mass may decrease the intensity of the obtained image, and a content exceeding 12% by mass may undesirably decrease discharge stability of the inkjet ink composition.

Also, carbon black to be used preferably has a specific surface area of 80 to 150 $m^2/g$, or more preferably 100 to 130 $m^2/g$. Carbon black in this range is particularly preferred in terms of, for example, abrasion resistance, solid filling property, and anti-mottling property of the colored image.

Also, carbon black to be used is preferably acidic carbon black, and more preferably has a pH of 2.5 to 4.0.

The specific surface area of the above-mentioned carbon black refers to the nitrogen adsorption specific surface area measured in accordance with Japanese Industrial Standards (JIS) K6217, and pH refers to the pH value measured in accordance with JIS K6221.

Such carbon black includes, for example, Mitsubishi carbon black MA7, MA77, MA8, MA11, MA100, and MA220.

(Other Inorganic Color Pigments)

Examples of other inorganic color pigments include titanium oxide, zinc flower, zinc oxide, lithopone, iron oxide, silicon dioxide, kaolinite, montmorillonite, talc, barium sulfate, calcium carbonate, silica, cadmium red, red iron oxide, molybdenum red, chrome vermillion, molybdate orange, lead yellow, chrome yellow, cadmium yellow, yellow iron oxide, titanium yellow, chromium oxide, viridian, cobalt green, titanium cobalt green, cobalt chrome green, ultramarine, ultramarine blue, Prussian blue, cobalt blue, cerulean blue, manganese violet, cobalt violet, mica, etc.

To the extent that it does not hinder the effects achieved by the present invention, any one type of these inorganic color pigments may be used alone or two or more types may be combined where the amount used is 0.5 to 10.0% by mass, or more preferably 2.0 to 7.0% by mass relative to the total amount of photocurable aqueous ink composition for inkjet printing. If the amount of pigment used is less than 0.5% by mass, the coloring strength tends to be insufficient, and the advantageous effect achieved by containing these inorganic color pigments may be insufficient. If the amount of pigment used exceeds 10.0% by mass, on the other hand, viscosity tends to rise, and the ink fluidity tends to drop.

(Pigment Dispersant)

A pigment dispersant that can be contained when the photocurable aqueous ink compositions for inkjet printing of the present invention have pigments, includes, for example, any ionic or nonionic surfactant or anionic, cationic, or nonionic high-molecular compound.

In particular, those constituted by high-molecular compounds are preferred and, for example, the carbodiimide-based compounds described in Japanese Patent Laid-open No. 2004-083872, International Patent Laid-open No. WO2003/076527, and International Patent Laid-open No. WO2004/000950, AJISPER PB821 and 822 that are basic functional group-containing copolymers (manufactured by Ajinomoto Fine-Techno Co., Inc.) (acid value and amine value are both 10 to 20 mgKOH/g), SOLSPERSE 32000 (manufactured by Lubrizol Corporation), SOLSPERSE 56000 (manufactured by Lubrizol Corporation), SOLSPERSE 39000 (manufactured by Lubrizol Corporation), DISPERBYK (manufactured by BYK-Chemie GmbH), etc., are preferred. Any one type of these pigment dispersants may be used alone, or two or more types may be combined.

It should be noted that any of the aforementioned pigment dispersants may be selected and used as deemed appropriate according to the type of pigment and type of organic solvent used.

(N-Monosubstituted Acrylamide)

The N-monosubstituted acrylamide in the present invention is a compound in which only one of the two hydrogen atoms bonded to a nitrogen atom of an amide group of acrylamide is substituted.

Examples of the N-monosubstituted acrylamide include N-isopropyl acrylamide, diacetone acrylamide, dimethylaminopropyl acrylamide, hydroxyethyl acrylamide, dihydroxyethyl acrylamide, methylol acrylamide, methoxymethyl acrylamide, ethoxymethyl acrylamide, and propoxymethyl acrylamide.

The content of the N-monosubstituted acrylamide in the entire photopolymerizable component contained in the photocurable aqueous ink composition for inkjet printing of the present invention is preferably 5.0% by mass or more, more preferably 10.0% by mass or more, and even more preferably 12.0% by mass or more. Additionally, it is preferably 35.0% by mass or less, more preferably 30.0% by mass or less, and even more preferably 25.0% by mass or less.

A content less than 5.0% by mass may fail to sufficiently exhibit the effects achieved by containing the N-monosubstituted acrylamide, and a content exceeding 35.0% by mass may fail to further improve the effects.

(Water-Soluble Polymerizable Compound Other than N-Monosubstituted Acrylamide)

The photocurable aqueous ink composition for inkjet printing of the present invention may contain a water-soluble polymerizable compound other than the N-monosubstituted acrylamide. Such a polymerizable compound is a compound that dissolves or is dispersed in an aqueous medium. In particular, the polymerizable compound preferably dissolves in the aqueous medium.

Such a compound may be any compound as long as it has a water-soluble radical polymerizable unsaturated bond or a water dispersible radical polymerizable unsaturated bond. And, a compound may be used that has, in the side chain or at the terminal, a hydrophilic group, such as a hydroxyl group, a carboxyl group, an amino group, an amide group, a sulfonate group, a phosphate group, or a polyoxyethylene chain as well as a radical polymerizable group, such as a (meth)acryloyl group, a vinyl group, and an allyl group, and any salt compounds of these compounds, which are monomers or oligomers, may be used.

Examples of such a compound are as follows.

Monomers having a hydroxyl group include (meth)acrylic monomers such as a (meth)acrylic acid ester of a polyhydric alcohol, a (meth)acrylic acid ester of a glycidyl ether of a polyhydric alcohol, a (meth)acrylic acid ester of a polyethylene glycol, a (meth)acrylic acid ester of an ethylene oxide adduct of a polyhydric alcohol, and a reaction product between a polybasic acid anhydride and a hydroxyl group-containing (meth)acrylic acid ester, and other UV curable monomers. Furthermore, oligomers having a hydroxyl group may be used.

The polyhydric alcohol may be one in which the chain is internally extended with an alkylene oxide chain by the addition of alkylene diol.

Among the monomers having a hydroxyl group, 2-hydroxyethyl(meth)acrylate, 2-hydroxypropyl(meth)acrylate, 2-hydroxybutyl(meth)acrylate, or 4-hydroxybutyl(meth)acrylate is preferably used.

The content of such a monofunctional monomer having a hydroxyl group in the entire photopolymerizable component of the photocurable aqueous ink composition for inkjet printing is preferably 10.0% by mass or more, and more preferably 20.0% by mass or more. Additionally, it is preferably 50.0% by mass or less, and more preferably 40.0% by mass or less.

Furthermore, (meth)acrylic acid esters may be used that include two or more (meth)acryloyl groups in one molecule derived from a polyol compound. Examples of the polyol compound include a condensation product of glycols, oligoethers, and oligoesters.

Although it does not necessarily have to be contained, when a (meth)acrylate ester compound of an epoxy compound, which is an oligomer, is contained, preferably an epoxy acrylate oligomer is contained for example, and its content relative to the entire photopolymerizable component in the photocurable aqueous ink composition for inkjet printing is preferably 3.0% by mass or more, and more preferably 6.0% by mass or more. Additionally, it is preferably 15.0% by mass or less, and more preferably 12.0% by mass or less.

It should be noted that polyalkylene glycol di(meth)acrylate may, but does not necessarily have to, be contained. When polyalkylene glycol di(meth)acrylate is contained, the content needs to be set within a range that does not decrease adhesion property. Thus, the content in the entire photopolymerizable component of the photocurable aqueous ink composition for inkjet printing is preferably 5.0% by mass or less, and more preferably 3.0% by mass or less.

Furthermore, as a nonionic polymerizable compound, a (meth) acrylic acid ester of a polyol having two or more hydroxyl groups such as sugar and disaccharide, or a (meth)acrylic acid ester of, for example, triethanolamine, diethanolamine, trishydroxyaminomethane, or trishydroxyaminoethane may, but does not necessarily have to, be contained.

Furthermore, the nonionic polymerizable compound may be acryloyl morpholine having a (meth)acrylamide structure in a molecule other than the N-monosubstituted acrylamide or a water-soluble polymerizable compound such as dimethylacrylamide and diethylacrylamide, which are N-disubstituted (meth)acrylamide. It should be noted that N-disubstituted (meth)acrylamide is a compound in which two hydrogen atoms bonded to a nitrogen atom of an amide group of acrylamide are both substituted.

However, N-disubstituted (meth)acrylamide is preferably not contained.

When N-disubstituted (meth)acrylamide is contained, the content of N-disubstituted (meth)acrylamide in the entire photopolymerizable component is preferably 20.0% by mass or more, and more preferably 30.0% by mass or more. Additionally, it is preferably 60.0% by mass or less, and more preferably 50.0% by mass or less.

Although acryloyl morpholine does not necessarily have to be contained, when acryloyl morpholine is contained, the content in the entire photopolymerizable component of the photocurable aqueous ink composition for inkjet printing is preferably 20.0% by mass or more, and more preferably 30.0% by mass or more. Additionally, it is preferably 60.0% by mass or less, and more preferably 50.0% by mass or less.

In the present invention, acryloyl morpholine and N-disubstituted (meth)acrylamide may be used in combination or each of these may be used alone.

A cationic polymerizable compound is a compound having a cationic group and a polymerizable group such as an unsaturated double bond. The cationic property of the ink composition is enhanced by containing the cationic polymerizable compound. It should be noted that the cationic polymerizable compound may, but does not necessarily have to, be contained.

Examples of the cationic polymerizable compound include N,N-dimethylaminoethyl(meth)acrylate, N,N-dimethylaminopropyl(meth)acrylate, N,N-dimethylamino (meth)acrylamide, N,N-dimethylaminoethyl(meth)acrylamide, N,N-dimethylaminopropyl(meth)acrylamide, and quaternized compounds thereof.

Furthermore, oligomers including an amino group and/or an amide group may be employed. Such an oligomer is an acrylated amine compound such as CN371, CN373, CN383, CN386 (manufactured by Sartomer), which are oligomers of an acrylated amine compound having two photopolymerizable functional groups and two amino groups per molecule.

Although it does not necessarily have to be contained, when the oligomer having an amino group and/or an amide group is contained, the content ratio of the oligomer having an amino group and/or an amide group in the entire photopolymerizable component of the photocurable aqueous ink composition for inkjet printing may be determined as required. However, the content is preferably 0.5% by mass or more, more preferably 1.0% by mass or more, and even more preferably 1.5% by mass or more. Additionally, the content is preferably 20.0% by mass or less, more preferably 10.0% by mass or less, and even more preferably 5.0% by mass or less. A content less than 0.5% by mass may fail to sufficiently exhibit the effects achieved by adding the oligomer, and a content exceeding 20.0% by mass may possibly damage the balance of the properties of the photocurable aqueous ink composition for inkjet printing.

A nitrogen-containing unsaturated monomer that can be contained includes, for example, N-vinyl pyrrolidone or N-vinyl acetamide.

A carboxyl group-containing unsaturated monomer that can be contained includes (meth)acrylic acid, maleic acid, maleic acid half ester, fumaric acid, fumaric acid half ester, and their salts.

In the present invention, the content of the water-soluble polymerizable compound other than N-monosubstituted acrylamide in the entire photopolymerizable component of the photocurable aqueous ink composition for inkjet printing of the present invention is preferably 30.0 to 65.0% by mass, more preferably 40.0 to 60.0% by mass, and even more preferably 50.0 to 55.0% by mass.

Although it does not necessarily have to be contained, when the polyfunctional photopolymerizable monomer is contained, the content in the entire photopolymerizable component of the photocurable aqueous ink composition for inkjet printing of the present invention is preferably 1.0 to 17.0% by mass, and more preferably 2.0 to 10.0% by mass.

However, an ether structure-containing (meth)acrylate compound and an N-substituted cyclic amide compound may, but do not necessarily have to, be contained.

It should be noted that, to the extent that it does not reduce the performance of the photocurable aqueous ink composition for inkjet printing of the present invention, water-soluble resins such as acrylic resin, vinyl chloride-based resin, vinyl chloride-vinyl acetate-based resin and ethylene-vinyl acetate-based resin, styrene-acrylic-based resin, and cellulose-based resin may be used in combination.

<Solvent>

The photocurable aqueous ink composition for inkjet printing of the present invention contains water. The content of water in the photocurable aqueous ink composition for inkjet printing is preferably 10.0% by mass or more, more preferably 25.0% by mass or more, and even more preferably 30.0% by mass or more. Additionally, the content is preferably 45.0% by mass or less, more preferably 40.0% by mass or less, and even more preferably 37.0% by mass or less.

The photocurable aqueous ink composition for inkjet printing of the present invention does not necessarily have to contain an organic solvent or may contain a water-soluble organic solvent to the extent that it does not hinder the effects achieved by the present invention.

The water-soluble organic solvent that can be contained in the photocurable aqueous ink composition for inkjet printing of the present invention preferably includes an alcohol-based solvent, a ketone-based solvent, and an ether-based solvent. The alcohol-based solvent includes, for example, isopropyl alcohol, n-butanol, t-butanol, and ethanol. The ketone-based solvent includes, for example, acetone, methyl ethyl ketone, diethyl ketone, and methyl isobutyl ketone. The ether-based solvent includes, for example, dibutyl ether and dioxane. Among these solvents, the ketone-based solvent such as methyl ethyl ketone and the alcohol-based solvent such as isopropyl alcohol are preferred.

When these water-soluble organic solvents are contained, the content is preferably 50.0 parts by mass or less, more preferably 30.0 parts by mass or less, and even more preferably 25.0 parts by mass or less relative to 100.0 parts by mass of water.

(Photoinitiator)

For the photoinitiator, 2,4,6-trimethylbenzoyl phenyl phosphinic acid ethyl (TPO-L), 2,4,6-trimethylbenzoyl-diphenyl-phosphine oxide (product name: TPO, manufactured by Lambson Group Ltd.), 2,4,6-trimethylbenzoyl phenyl phosphinic acid ethyl bis (product name: TPOL), or bis(2,4,6-trimethylbenzoyl)-phenyl phosphine oxide (product name: IRGACURE 819, manufactured by BASF Corporation) may be used.

The content of the photoinitiator is preferably in the range of 3 to 25% by mass, or more preferably in the range of 5 to 15% by mass relative to the total mass of the photopolymerizable components.

The content being within this range is important in terms of maintaining a balance between discharge property, curability, and storage stability of the ink composition.

It should be noted that a photoinitiator having an ethylene oxide structure may, but does not necessarily have to, be employed.

(Sensitizer)

The photocurable aqueous ink composition for inkjet printing of the present invention may further combine and use a photosensitizer (compound) with a photoinitiator in order to promote curability under ultraviolet ray from a light-emitting diode (LED) light source. The photosensitizer has light absorption characteristics over a range of ultraviolet ray wavelengths of primarily 400 nm or higher and expresses sensitization function to cause curing reaction when exposed to light of wavelengths in this range.

The sensitizer is an anthracene-based sensitizer, thioxanthone-based sensitizer, etc., but preferably a thioxanthone-based sensitizer to the extent that it can dissolve. Any one of these may be used alone or two or more types may be combined.

Specific examples include 9,10-dibuthoxy anthracene, 9,10-diethoxy anthracene, 9,10-dipropoxy anthracene, 9,10-bis(2-ethyl hexyl oxy) anthracene, and other anthracene-based sensitizers, as well as 2,4-diethyl thioxanthone, 2-isopropyl thioxanthone, 4-isopropyl thioxanthone, and other thioxanthone-based sensitizers. Representative examples of commercial products include, for example, DBA and DEA (manufactured by Kawasaki Kasei Chemicals) for anthracene-based sensitizers, and DETX and ITX (manufactured by Lambson Group Ltd.) for thioxanthone-based sensitizers.

The content of the sensitizer is preferably in the range of 0 to 8.0% by mass relative to the total mass of the photopolymerizable components. Adding the sensitizer by more than 8.0% by mass is excessive and does not improve the effects, which is not desirable.

It should be noted that, if a thioxanthone-based sensitizer is used as the sensitizer, the photocurable aqueous ink composition for inkjet printing tends to become yellower and may assume a more yellowish hue than a color based on the pigment (inherent hue); therefore, preferably the content of the thioxanthone-based sensitizer is determined for each color as deemed appropriate.

Specifically, in the case of a white ink composition or clear ink composition affected more by a change in tone, preferably its sensitizer does not contain any thioxanthone compound. Additionally, in the case of a magenta ink composition or cyan ink composition that presents a problem if the hue changes, preferably a sensitizer is used to the extent that it does not cause a problem with the hue. In the case of a black ink composition or yellow ink composition whose hue is not affected by discoloration and whose photopolymerizability is lower than compositions of other hues, preferably a thioxanthone-based compound is combined and used as a sensitizer.

(Other Components)

Furthermore, in the photocurable aqueous ink composition for inkjet printing of the present invention, various types of additives such as surfactant, plasticizer, polymerization inhibitor, silicone-based surface conditioner such as BYK-333, ultraviolet protective agent, photostabilizer, antioxidant, etc., may be used as necessary.

(Production of Photocurable Aqueous Ink Composition for Inkjet Printing)

A method for producing the photocurable aqueous ink composition for inkjet printing of the present invention will be described.

The photocurable aqueous ink composition for inkjet printing of the present invention can be obtained by, for example, dispersing and mixing the materials using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus PY, DeBEE 2000, etc.), pearl mill, or other dispersion machines.

Preferably the content of the solvent in the photocurable aqueous ink composition for inkjet printing of the present invention, which is the total amount of ink composition less the total sum of the amounts of solid contents and other additives that may be used as necessary, is changed as deemed appropriate so as to bring ink viscosity into the appropriate range.

The thus obtained photocurable aqueous ink composition for inkjet printing of the present invention can be used with inkjet printers on substrates whose top face layer at least is constituted by paper or a resin such as a vinyl chloride-based polymer or an ethylene-vinyl acetate-based copolymer.

(Use)

The photocurable aqueous ink composition for inkjet printing of the present invention may be used for known purposes including paper substrates, but is particularly suitable for use on the top face layer of a substrate that requires adhesion property and water resistance, and is constituted by a non-absorbent material. Non-absorbent materials may be any material including metals, resins, ceramics, etc., but preferably the ink composition is used on top face layers of resin substrates, or more strictly on top face layers where this resin is constituted by a vinyl chloride-based polymer or ethylene-vinyl acetate-based copolymer, vinyl chloride resin, polyethylene terephthalate, polycarbonate, etc., from the viewpoint of water resistance, and other properties. Also, preferably the ink composition is used on top face layers where this resin is constituted by polyethylene terephthalate (PET), vinyl chloride resin, polycarbonate, tarpaulin, acrylic-based resin, etc., from the viewpoint of adhesion property, and other properties.

The specific method for printing and curing the photocurable aqueous ink composition for inkjet printing of the present invention includes discharging the photocurable aqueous ink composition for inkjet printing of the present invention with an inkjet head onto a substrate and then exposing the coating film of the ink composition of the present invention that has landed on the substrate to light to be cured. Furthermore, before or after exposure to light and curing, a process for drying moisture in the photocurable aqueous ink composition for inkjet printing may be provided. Conventionally known various methods may be used as the method for drying moisture and include, for example, hot-air drying, oven-drying, and drying by (near-)infrared irradiation.

For example, discharging of the ink composition onto the substrate (printing of images) is achieved by supplying the photocurable aqueous ink composition for inkjet printing of the present invention to the printer head of an inkjet recording printer designed for a low-viscosity ink and discharging the ink composition from the printer head onto the substrate so that the thickness of the coating film is, for example, 1 to 60 μm. Also, exposure to light and curing (curing of the images) are achieved by irradiating with light the coating film of the photocurable aqueous ink composition for inkjet printing of the present invention applied to the substrate as the images.

Any conventionally used inkjet recording printer may be used as the inkjet recording printer that prints the photocurable aqueous ink composition for inkjet printing of the present invention. It should be noted that when a continuous inkjet recording printer is used, a conductivity-imparting agent is further added to the photocurable aqueous ink composition for inkjet printing of the present invention to adjust conductivity.

Examples of the light source used in curing the coating film include ultraviolet ray (UV), ultraviolet ray (light-emitting diode (LED)), electron beam, and visible light, but from an environmental perspective, a light-emitting diode (LED) that emits ultraviolet ray having an emission peak wavelength in the range of 350 to 420 nm is preferred.

Ultraviolet ray from a light-emitting diode (LED) light source is defined as "light emitted from a light-emitting diode that generates ultraviolet ray having an emission peak wavelength in the range of 350 to 420 nm".

EXAMPLES

The present invention is explained in greater detail below using examples; however, the present invention is not limited to these examples. It should be noted that, unless otherwise specified, "%" means "% by mass," while "part" means "part by mass."

The materials used in Examples and Comparative Examples below are listed below. All components other than solvents are expressed in solids content.

In the table, the unit of values in the rows of Pigments, Dispersants, Resins, Solvents, and Total is "% by mass."

Examples 1 to 3 and Comparative Examples 1 to 3

<Production of Photocurable Aqueous Ink Composition for Inkjet Printing>

According to the formulations in Table 1 (formulation ratio of each material is based on % by mass), the respective materials were mixed under agitation to obtain the photocurable aqueous ink compositions for inkjet printing in Examples and Comparative Examples.

CN131B: epoxy acrylate oligomer (manufactured by Sartomer)
ACMO: acryloyl morpholine
DEAA: diethylacrylamide
4-HBA: 4-hydroxybutyl acrylate
DAAM: diacetone acrylamide
NIPAM: N-isopropylacrylamide
PEG(400)DA: polyethylene glycol (400) diacrylate
TPO-L: 2,4,6-trimethylbenzoyl phenyl phosphinic acid ethyl
BYK-333: polyether-modified polydimethylsiloxane (manufactured by BYK-Chemie GmbH)
PB 15:4: Pigment Blue 15:4
SOLSPERSE 32000: pigment dispersant (manufactured by Lubrizol Corporation)

<Evaluation Method and Evaluation Criteria>

(Miscibility)

The components excluding the pigments and the pigment dispersants in the compositions of Examples and Comparative Examples were mixed under agitation and left still for 10 minutes. The compositions were then visually observed to check the mixed state.

○: Uniformly mixed
×: Layer separation was observed (Curability)

The photocurable aqueous ink compositions for inkjet printing obtained in Examples and Comparative Examples were each applied to the surface of a PET film (product name: Lumirror, manufactured by Toray Industries, Inc.) using a bar coater No. 8 to obtain a coated matter. Subsequently, a conveyor irradiator (STM-250E-16 manufactured by Heraeus Holding, lamp: Z-8 lamp (metal halide type)) was used to pass the coated matter through the conveyor irradiator under irradiation conditions of 120 W×50 m/min and an integrated UV intensity of 240 mJ/cm$^2$ [the integrated UV intensity was obtained by measuring the amount of irradiation in the measurement ranges of 250 to 260 nm, 280 to 320 nm, 320 to 390 nm, and 395 to 445 nm using UVIMAP (UM 365H-S) manufactured by EIT Inc. as a measuring instrument]. The irradiated portion of each coated matter was rubbed with a cotton swab to evaluate the removal of the coating film.
◯: No removal of coating film
✕: Removal of coating film was found
(Adhesion Property)

The photocurable aqueous ink compositions for inkjet printing obtained in Examples and Comparative Examples were each applied to the surface of a PET film (product name: Lumirror, manufactured by Toray Industries, Inc.) using a bar coater No. 4 and were exposed to ultraviolet ray to obtain cured coating films.

A cutter was used to apply a cross cut on the obtained cured coating films, and Cellotape (registered trademark) was adhered to each cut portion and peeled off to evaluate the removal of the cured coating film.
◯: No removal of coating film
✕: Removal of coating film was found
(Water Resistance)

The photocurable aqueous ink compositions for inkjet printing obtained in Examples and Comparative Examples were each applied to the surface of a PET film (product name: Lumirror, manufactured by Toray Industries, Inc.) using a bar coater No. 4 and were exposed to ultraviolet ray to obtain cured coating films.

A cotton swab moistened with water was rubbed against each of the obtained cured coating films back and forth 30 times, and the coating films were evaluated according to the following evaluation criteria.
◯: Base was not exposed
✕: Base was exposed production of the photocurable aqueous ink composition for inkjet printing was poor. According to Comparative Example 3 in which polyethylene glycol (400) diacrylate was contained instead of N-monosubstituted acrylamide of Examples 1 and 2, adhesion property was poor.

What is claimed:

1. A photocurable aqueous ink composition for inkjet printing, comprising:
   water by 10.0 to 45.0% by mass in the photocurable aqueous ink composition for inkjet printing;
   a colorant;
   a water-soluble polymerizable compound containing N-monosubstituted acrylamide and an epoxy acrylate oligomer, wherein a content of the epoxy acrylate oligomer is 3.0% by mass or more and 12.0% by mass or less relative to all photopolymerizable components including the water-soluble polymerizable compound and the epoxy acrylate oligomer; and
   a photoinitiator.

2. The photocurable aqueous ink composition for inkjet printing according to claim 1, which comprises the N-monosubstituted acrylamide by 10.0 to 30.0% by mass relative to an entire photopolymerizable component.

3. The photocurable aqueous ink composition for inkjet printing according to claim 1, which comprises acryloyl morpholine and/or diethylacrylamide as the N-monosubstituted acrylamide.

4. The photocurable aqueous ink composition for inkjet printing according to claim 2, which comprises acryloyl

TABLE 1

|  |  | Examples | | | Comparative Examples | | |
|---|---|---|---|---|---|---|---|
|  |  | 1 | 2 | 3 | 1 | 2 | 3 |
| Epoxy acrylate oligomer | CN131B | 5.0 | 5.0 | 5.0 | 5.0 | 15.0 | 5.0 |
| Water-soluble polymerizable compound | ACMO | 25.0 | 25.0 |  | 25.0 | 25.0 | 25.0 |
|  | DEAA |  |  | 25.0 |  |  |  |
|  | 4-HBA | 20.0 | 20.0 | 20.0 | 20.0 | 20.0 | 20.0 |
|  | DAAM | 10.0 |  | 10.0 |  |  |  |
|  | NIPAM |  | 10.0 |  |  |  |  |
|  | PEG(400)DA |  |  |  |  |  | 10.0 |
| Initiator | TPO-L | 5.0 | 5.0 | 5.0 | 5.0 | 5.0 | 5.0 |
| Surface conditioner | BYK-333 | 0.2 | 0.2 | 0.2 | 0.2 | 0.2 | 0.2 |
| Pigment | PB 15:4 | 2.0 | 2.0 | 2.0 | 2.0 | 2.0 | 2.0 |
| Pigment dispersant | SOLSPERSE 32000 | 0.8 | 0.8 | 0.8 | 0.8 | 0.8 | 0.8 |
| Water |  | 32.0 | 32.0 | 32.0 | 42.0 | 32.0 | 32.0 |
| Total |  | 100.0 | 100.0 | 100.0 | 100.0 | 100.0 | 100.0 |
| Evaluation results | Miscibility | ◯ | ◯ | ◯ | ◯ | ✕ | ◯ |
|  | Curability | ◯ | ◯ | ◯ | ◯ | — | ◯ |
|  | Adhesion property | ◯ | ◯ | ◯ | ◯ | — | ✕ |
|  | Water resistance | ◯ | ◯ | ◯ | ✕ | — | ◯ |

Examples 1 to 3 according to the present invention were excellent in miscibility during production of the photocurable aqueous ink composition for inkjet printing, and curability, adhesion property, and water resistance of a coating film. In contrast, Comparative Example 1, which does not contain N-monosubstituted acrylamide, was poor in water resistance. According to Comparative Example 2 in which the content of the epoxy acrylate oligomer was increased compared with Comparative Example 1, miscibility during morpholine and/or diethylacrylamide as the N-monosubstituted acrylamide.

5. The photocurable aqueous ink composition for inkjet printing according to claim 1, wherein all acrylamides contained in the water-soluble polymerizable compound are N-monosubstituted acrylamides.

* * * * *